United States Patent [19]

Miner et al.

[11] Patent Number: 5,229,199
[45] Date of Patent: Jul. 20, 1993

[54] RIGID COMPOSITE COMPRISING WOVEN ARAMID FABRICS COATED WITH AN ADHESION MODIFIER AND EMBEDDED IN A MATRIX RESIN

[75] Inventors: Louis H. Miner, Kennett Square; George E. Zahr, Glen Mills, both of Pa.

[73] Assignee: E. I. Du Pont de Nemours and Company, Wilmington, Del.

[21] Appl. No.: 723,313

[22] Filed: Jun. 28, 1991

Related U.S. Application Data

[63] Continuation-in-part of Ser. No. 378,934, Jul. 12, 1989, abandoned, which is a continuation-in-part of Ser. No. 130,439, Dec. 15, 1987, abandoned, which is a continuation-in-part of Ser. No. 765,284, Aug. 13, 1985, abandoned.

[51] Int. Cl.$^5$ ............... B32B 27/02; D03D 25/00
[52] U.S. Cl. ............... 428/272; 428/245; 428/284; 428/286; 428/287; 428/288; 428/289; 428/290; 428/375; 428/378; 428/902; 428/911
[58] Field of Search ............... 428/284, 286, 288, 290, 428/375, 272, 245, 287, 289, 375, 378, 902, 911

[56] References Cited

U.S. PATENT DOCUMENTS 4,613,535  9/1986  Harpell et al. ............... 427/284
4,678,821  7/1987  Logullo, Sr. et al. ............... 428/375

*Primary Examiner*—George F. Lesmes
*Assistant Examiner*—James D. Withers

[57] ABSTRACT

A rigid composite of a polyester, phenolic, or polyamide resin matrix reinforced with continuous filaments of a p-aramid coated with an adhesion modifier.

5 Claims, 2 Drawing Sheets

19 PLY FABRIC

26 PLY FABRIC

RIGID COMPOSITE COMPRISING WOVEN ARAMID FABRICS COATED WITH AN ADHESION MODIFIER AND EMBEDDED IN A MATRIX RESIN

BACKGROUND OF THE INVENTION

The present application is a continuation-in-part of application Ser. No. 07/378,934 filed Jul. 12, 1989, now abandoned, which was a continuation-in-part of application Ser. No. 07/130,439 filed Dec. 15, 1987, now abandoned, which was a continuation-in-part of application Ser. No. 06/765,284 filed Aug. 13, 1985, now abandoned.

Mumford et al. described the use of Kevlar ® 49 in filament wound pressure vessels in an article from the AIAA/SAE/ASME 18th Joint Propulsion Conference, Jun. 21–23, 1982, Cleveland, Ohio. For such application, the filaments are ordinarily embedded in an epoxy resin matrix. The article suggested that a higher fraction of the fiber ultimate strength can be utilized by coating the fiber with from 5 to 9% of a silicone release agent before embedment in the epoxy resin.

U.S. Pat. No. 4,678,821, issued Jul. 7, 1987 discloses improved filament wound pressure vessels wherein the epoxy-embedded filaments are coated by 2-perfluoroalkylethyl esters or paraffin wax instead of silicone release agents.

Walling, in a paper entitled S-2 Glass Fiber: Its Role in Military Applications, for the Proceedings of the Fifth International Conference on Composite Materials (ICCM-V), San Diego, Calif. (Jul. 29, 30, Aug. 1, 1985), discloses glass fiber as useful in ballistics composites at elevated areal densities.

The present invention provides a rigid composite of significantly improved ballistics performance, lighter weight, and reduced areal density for a given ballistics performance level.

SUMMARY OF THE INVENTION

A rigid composite comprising a polyester, phenolic, or polyamide resin matrix reinforced with continuous p-aramid filaments coated with from about 0.2 to 5 percent, by weight, of a solid adhesion modifier, said coated filaments, when embedded in a polyester, phenolic, or polyamide resin matrix and tested in accordance with MIL-STD-662D (19 Mar. 1984), exhibit a ballistics limit between about 1000 and 4000 feet per second and a composite areal density from about 0.4 to 6 pounds per square foot.

The solid adhesion modifier is, preferably, a 2-perfluoroalkylethyl ester or paraffin wax or a combination of those materials. The composite, generally, comprises from about 50 to 90 percent, by weight, filaments and is, preferably, from about 60 to 85 percent, by weight, filaments.

DETAILED DESCRIPTION OF THE INVENTION

Figure 1A:
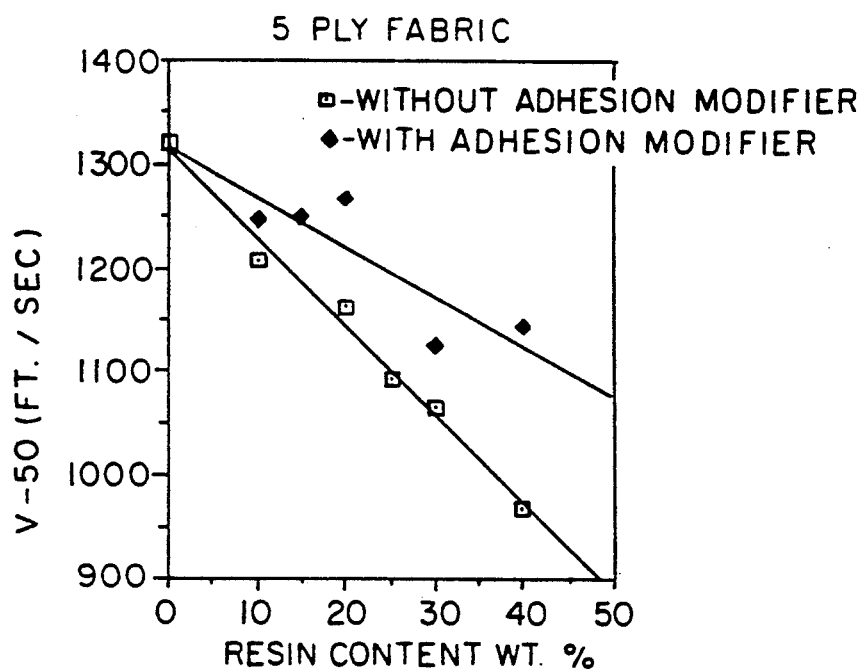
FIG. 1 is a series of graphical representations of the relationship between ballistics limit ($V_{50}$) and Resin Content as a weight percent of rigid composites with several different areal densities, as denoted by the number of fabric plies in the composites. The relationships are shown for rigid composites, both, with adhesion modifier and without adhesion modifier.

This invention relates to continuous filament reinforced, rigid, composites. High tenacity, high modulus, p-aramid filaments are useful for such composites.

The term "aramid" is used to designate wholly aromatic polyamides. Not all aramid fibers are useful in the present invention. Only those derived from aromatic polyamides whose chain extending bonds are predominantly either coaxial or parallel and oppositely directed are preferred. Small amounts of aramid units whose chain extending bonds are not oppositely directed, may be present; provided the filament tenacity and modulus are not unduly reduced, thereby. For example, up to 15% or perhaps slightly more of units with meta-oriented bonds may be present. High strength, high modulus aramid fibers useful in the present invention may be prepared by the processes described in U.S. Pat. Nos. 3,767,756; 3,869,430; and 4,075,172. The fibers are characterized by filament tenacities of at least 15 gpd (13.2 dN/tex) and moduli of at least 400 gpd (354 dN/tex). These fibers will be referred to hereinafter as p-aramid fibers. Particularly preferred are p-aramid fibers based on poly(p-phenylene terephthalamide) as produced by E. I. du Pont de Nemours & Co. under the trademark Kevlar ®.

The matrix component of the composite of the invention is a polyester, phenolic, or polyamide resin. Such materials are well known in the art and, in the cured state, provide strong rigid structures. Among suitable polyester resins, there may be mentioned vinyl ester resins and orthopolyester resins. Vinyl ester resins are the reaction products of an epoxy resin and an unsaturated aliphatic acid such as methacrylic or acrylic acid. Typically-used epoxy resins are of the diglycidyl ether/bisphenol-A type but may be, also, be such components as epoxy novolac or halogenated epoxy.

Ortho polyesters are the reaction product of a glycol, an unsaturated aliphatic dibasic acid or its anhydride, and a saturated ortho aromatic acid or its anhydride. The glycol is usually propylene glycol but may be other glycols such as ethylene glycol, diethylene glycol, dipropylene glycol, and the like. The unsaturated dibasic acid or anhydride is usually maleic acid, fumaric acid, or maleic anhydride; but may be other similar acids or anhydrides. The ortho aromatic acid or anhydride is usually orthophthalic acid or orthophthalic anhydride but, of course, may be other saturated ortho aromatic acids and may be modified acids such as by being halogenated with chlorine.

Vinyl ester resins and orthophthalic and isophthalic polyester resins are generally cured by reaction with a monomer such as styrene or a substituted styrene such as vinyl toluene or alpha-methyl styrene; but other monomers may also be used such as methyl methacrylate, methyl acrylate, diallyl phthalate, triallyl cyanurate, and the like.

Phenolic resins can be of the resole type or the novolac type. Generally, the resole type is used in this invention. The phenolic resins are generally made from the reaction between a phenol and an aldehyde. Formaldehyde is usually used but, as is well-known, other aldehydes could also be suitable. Phenol is usually used but other suitable phenols include resorcinol and ring-substituted phenols such as ortho-, meta-, or para-cresol, bisphenol A, p-t-butyl phenol, p-phenylphenol, and the like.

Polyamide resins may, also, be used as the matrix component of the composite of this invention. Such polyamide resins must be melt-processable, preferably at below 350° C. Many types of such resins are useful, including aliphatic, cycloaliphatic and aliphatic-aromatic polyamides. These include 6,6 nylon; 6 nylon; 6,10 nylon; 6,12 nylon; polyamide from 4,4'-bis-(aminocyclohexyl) methane and dodecanedioic acid; poly(hexamethylene terephthalamide); poly(hexamethylene isophthalamide); and the like. Copolymers of the above polyamides are also useful.

The composite of the present invention demonstrates its improved ballistics qualities by the use of filaments which, before embedment, have been coated with an adhesion modifier. The composite of this invention requires that coating and it is the use of that coating, in combination with other elements of the composite, which defines the invention. The function of the coating of adhesion modifier is to reduce the adhesion level between the p-aramid filaments and the resin matrix as discussed in greater detail below. From about 0.2 to about 5 percent, by weight, of such adhesion modifier is applied to the filaments to achieve the desired ballistics results at areal densities of this invention. Less than about 0.2 percent of the modifier provides inadequate results and more than about 5 percent does not appear to provide significant additional improvement.

The adhesion modifier may be applied in any of a variety of ways to provide even distribution on the surface of the filaments. For example, it may be dissolved in a solvent, applied to the filaments and the solvent driven off, or it may be dispersed in a carrier (for example, water) and applied to the filaments, or it may be applied directly in the absence of other ingredients. One of the more common ways of application is from a dispersion of the adhesion modifier in water. In a generally useful way of preparing such a dispersion, the adhesion modifier is melted or dissolved in an organic solvent (for example, methylisobutyl ketone) and mixed with an aqueous solution of a dispersing agent, yielding a two-phase mixture. The mixture is then agitated under high shear conditions to yield a dispersion. The organic solvent is stripped off by distillation under vacuum to leave the desired aqueous dispersion. Suitable dispersing agents are sodium dodecylbenzenesulfonate and octadecyl trimethylammonium chloride. Of course, other dispersing agents can be used and a variety of such products are commercially available under trademarks such as "Armeen" 14D and 18D, "Merpol" OJS and HCS, and "Arquad" 1250.

The adhesion modifier may be characterized as a solid which is not readily absorbed or dissolved in the filaments or resin. As a solid it will have less tendency to migrate during preparation of the composite or in use. It is important that the modifier reduce the adhesion between fiber and matrix to limit loading on the fiber which tends to prevent maximum utilization of ultimate fiber strength.

With the composites under consideration it has been found that the desirable ballistics qualities are achieved at the low modifier add-on level specified, that is, from about 0.2 to 5 percent, by weight. At areal densities of about 0.4 to 6 pounds per square foot, the preferred level of modifier is from about 1 to 2 percent, by weight.

Ballistics limit ($V_{50}$) is defined as the velocity at which a projectile of specified weight and dimensions has a 50 percent probability of penetrating a rigid composite under the conditions of a ballistics test which is identified as MIL-STD-662D, Ballistic Test for Armor (19 Mar. 1984). For composites having an areal density less than 4.0 pounds per square foot, a 17 grain projectile has been used in practice of this invention. For composites having an areal density greater than 4.0 pounds per square foot, a 44 grain projectile is suggested. The projectile configuration has been defined in MIL-P-46593.

Areal density is defined as the weight per unit area of a rigid composite under test.

The ballistics test, MIL-STD-662D, involves propelling test projectiles at varying, known, velocities against samples of rigid composite until the velocity is determined at which a test projectile would have a 50 percent probability of penetrating the rigid composite.

One advantage of obtaining the desired adhesion at low add-on levels is that there is overall weight reduction of the composite as compared with those amounts of silicone materials reported in the art. Another advantage is that low add-on permits a greater concentration of filaments based on the weight of the composite.

Two groups of surface modifiers for p-aramid filaments useful for this invention are certain fluorochemicals and paraffin waxes, and combinations thereof. The fluorochemicals may be described as 2-perfluoroalkylethyl esters where the 2-perfluoroalkylethyl group has the structure $C_nF_{2n+1}(CH_2)_2-$ and $n=5-11$. Esters which are useful are those of methacrylic acid in polymeric form, citric acid urethane, and phosphoric acid or its ammonium salts, and the like. Esters of this type are shown, among other places, in U.S. Pat. Nos. 3,282,905 and 3,378,609. The esters may be applied in combination with coupling agents such as other acrylic, methacrylic and/or acrylamide polymers to promote pickup and dispersion of the fluorochemical on the p-aramid filaments. The paraffin waxes are solids derived from petroleum with melting points above room temperature. A paraffin wax with a melting point of about 60° C. is generally preferred. The paraffin waxes may be applied with coupling agents such as a behenic acid ester derivative of melamine in order to promote the pickup and dispersion of the wax on the p-aramid filaments. A combination of fluorochemical and paraffin wax is the preferred surface modifier for practice of this invention.

The present invention is particularly useful in ballistics composites of the areal densities of this invention. Such composites can tolerate ballistic impact and prevent projectile penetration better if the reinforcing filaments have been coated in accordance with this invention prior to being incorporated in the resin matrix than when uncoated filaments have been used. Use of these coatings also avoids the problems associated with application of liquid silicone release agents as used in the art. The latter tend to coat filaments unevenly and require extensive drying or curing periods, and are messy to use. They are generally employed in large amounts, that is, 5 to 9 percent, by weight, (see Mumford et al., supra), thus adding undesirable weight to the composite. It is also understood that the frictional qualities of such silicone coated yarn would discourage use of such yarn in rigid composites.

Use of the coated aramid filaments of this invention permits the manufacture of extremely light, highly effective composites when compared with composites of the prior art utilizing glass fiber. The density of the aramid filaments is about 1.45 g/cc while the density of glass fibers is about 2.5 g/cc. Therefore, a smaller weight of aramid filaments than glass fibers is needed to provide equivalent ballistics results, thus, permitting lighter composites when the composites are made in accordance with this invention.

It will be understood that the examples below are believed to be representative of the present invention. Further, a change in the amount of add-on or operation outside the specified areal density range might result in ballistics limits outside the scope of the invention.

EXAMPLE 1

This example includes manufacture of the rigid composite of this invention and comparative ballistics testing of that composite against the composite which results from using no adhesion modifier. The fabric used for this example was a fabric made from poly(p-phenylene terephthalamide) fiber sold by E. I. du Pont de Nemours & Co. under the trademark designation Kevlar ® 29 and identified as Style 710. Style 710 fabric is a plain weave fabric made from 1500 denier continuous fibers at a nominal yarn count of 24 by 24 ends and picks per inch (9.4×9.4 per centimeter) and a nominal basis weight of 9.6 oz/square yard (326 g/square meter).

The fabric was open-width (jig) scoured to remove yarn finish and warp size. The scouring was done in water having 1 g/liter of a surface active agent; and the temperature of the water was raised from 100° F. (38° C.) to 200° F. (93° C.) in 20° F. (11° C.) increments. The fabric was passed twice through the water at each temperature increment for a total of 12 passes. The surface active agent used in this case was "Merpol" HCS sold by E. I. du Pont de Nemours & Co. The fabric was rinsed with water, vacuum extracted and dried on a clip tenter frame at 250° F. (121° C.). The dried fabric was used, without further treatment in the comparative portion of this Example.

To prepare fabric for use in the composite of this invention, the scoured and dried fabric was dipped twice in baths containing a dispersion of the adhesion modifier (described below) at 100–110° F. (38°–43° C.) and single-nipped through rubber rollers. The fabric was then dried and cured on a clip tenter frame at 380° F. (193° C.) for two minutes. The fabric so-treated was washed at 160° C. (71° C.) and thoroughly rinsed with water at 140° F. (60° C.). It was squeezed and dried at 325° F. (163° C.) for 5 minutes.

The adhesion modifier baths mentioned above contained the following in the form of an aqueous dispersion: (1) a fluorochemical mixture, as a dispersion, comprising two interpolymers and a surfactant. One interpolymer, comprising 1.8 percent, by weight, of the bath was derived from about 75% 2-perfluoroalkylethyl ester of methacrylic acid wherein the 2-perfluoroalkylethyl group had the formula, $C_nF_{2n+1}(CH_2)_2$—, and n had a value of from 5 to 11, about 25% 2-ethylhexyl methacrylate, about 0.25% N-methylolacrylamide and about 0.25% 2-hydroxyethyl-methacrylate. The second interpolymer, comprising 1.4%, by weight, of the bath was derived from about 97–98% of 2-ethylhexyl methacrylate, 2% N-methylol acrylamide and 0.1% ethylenedimethacrylate. The surfactant, 0.1 percent, by weight, of the bath, was the hydrochloride salt of ethoxylated stearyl amine. The interpolymers are disclosed in U.S. Pat. Nos. 3,282,905 and 3,378,609. (2) a wax-melamine mixture, as a dispersion. The wax component, about 1.0 percent, by weight, of the bath, was a paraffin wax derived from petroleum with a melting point of about 60° C. The melamine component, comprising about 1 percent, by weight, of the bath, was a melamine derivative wherein each non-ring nitrogen contained one methoxymethylene group and one —CH$_2$—O—CO—C$_{21}$H$_{43}$ group.

The dispersant for the wax mixture was a combination of the acetate salts of "Armeen" DM-18D and DM-14D, sold by Armour Hess Chemicals Company. (3) About 0.1 percent, by weight, of an ethoxylated amine hydrochloride as a surfactant stabilizer. (4) About 3 percent, by weight, of isopropyl alcohol as a wetting agent. (5) About 92 percent, by weight water.

The surface-modified fabric contained about 0.8 percent, by weight, of the fluorochemical mixture and about 0.5 percent, by weight, of the wax-melamine mixture.

To make rigid composite plies, the fabric was cut into rectangular pieces about 12×15 inches (30.5×38 cm) and, as described hereinafter, each piece was sprayed with a solution of the matrix resin. The matrix resin was an ortho polyester sold by Reichhold Chemicals, Inc., White Plains, N.Y. 10603 and identified as "Polylite" Resin 33-072. One percent, by weight, of methylethylketone peroxide was used as curing accelerator and the resin was diluted with 20 percent, by weight, of acetone to obtain a suitable solution viscosity for spraying.

A layup of plies to form a rigid composite test sheet was made by stacking materials in the following sequence: A bottom plate of ¼ inch (6.4 mm) thick aluminum; a polyester film release sheet; individual layers of fabric sprayed by the amount of matrix resin solution which will result in a composite which is about 40 percent, by weight, resin; a polyester film release sheet; and a top plate of ¼ inch thick aluminum. The layup was placed in a press where a pressure of 100 pounds/square inch (689 kPa) was applied. The layup, under maintained pressure, was heated to about 108° C. The temperature and pressure were maintained for one hour. It was then cooled to about 28° C. and removed from the press. The aluminum top and bottom plates were removed and the composite was trimmed for testing. The number of plies in each composite sample is shown in the Table 1.

Ballistics tests of the rigid composite samples were conducted in accordance with MIL-STD-662D as follows: A layup to be tested was placed in a sample mount to hold the layup rigid and perpendicular to the path of test projectiles. The projectiles were 17-grain fragment simulating projectiles (MIL-P-46593) and were propelled from a test weapon capable of firing the projectiles at different velocities. The first firing for each layup was for a projectile velocity estimated to be the likely ballistics limit ($V_{50}$) When the first firing yielded a complete layup penetration, the next firing was for a projectile velocity of about 50 feet per second less in order to obtain a partial penetration of the layup. On the other hand, when the first firing yielded no penetration or partial penetration, the next firing was for a velocity of about 50 feet per second more in order to obtain a complete penetration. After obtaining one partial and one complete projectile penetration, subsequent velocity increases or decreases of about 50 feet per second were used until enough firings were made to determine the ballistics limit ($V_{50}$) for that layup.

The ballistics limit ($V_{50}$) was calculated by finding the arithmetic mean of an equal number of at least three of the highest partial penetration impact velocities and the lowest complete penetration impact velocities, provided that there is not more than 125 feet per second between the highest and lowest individual impact velocities.

The actual resin content of each rigid composite sample was calculated from the known weight of the fiber in the sample and the total weight of the sample. See Table 1.

The composite areal density was determined for each rigid composite sample by merely weighing a sample of known surface area. As can be seen from Table 1, the ballistics limit ($V_{50}$) was significantly improved for each rigid composite sample in which the p-aramid reinforcement was coated with an adhesion modifier.

TABLE 1

| Adhesion Modifier | Number of plies | Actual Resin % | Compos. Areal Density (lb/ft2) | Ballist. limit $V_{50}$ (ft/sec) | % Improvement |
| --- | --- | --- | --- | --- | --- |
| No | 10 | 32.7 | 0.99 | 1153 | 16.0 |
| Yes | 10 | 38.3 | 1.08 | 1338 | |
| No | 15 | 40.1 | 1.67 | 1482 | 18.5 |
| Yes | 15 | 39.0 | 1.64 | 1756 | |
| No | 20 | 39.9 | 2.22 | 1816 | 17.5 |
| Yes | 20 | 44.4 | 2.40 | 2134 | |
| No | 30 | 39.4 | 3.30 | 2320 | 5.6 |
| Yes | 30 | 37.5 | 3.20 | 2450 | |

EXAMPLE 2

This example describes the preparation of additional rigid composite articles of this invention along with comparative composites prepared without the use of adhesion modifiers.

The fabric used for this example was a fabric of poly(p-phenylene terephthalamide) fiber sold by E. I. du Pont de Nemours & Co. under the trademark designation Kevlar ® 29 and identified as Style 735. Style 735 fabric is a 2×2 basket weave construction with nominally 35 picks and 34 ends of 1500 denier yarn and a basis weight of nominally 14 oz/square yard.

The fabric was scoured using the same procedure as was used in Example 1; and was coated using the same procedure and the same kind of solid adhesion modifier as was used in Example 1. Nominal resin content was varied from about 10 to about 45 percent, by weight, based on weight of the fabric. Control fabric was, also, prepared in the same manner as was used in Example 1.

A series of Example (With Adhesion Modifier) and Comparative (Without Adhesion Modifier) rigid composite test sheets was prepared as described in Example 1 by varying the number of fabric plies and the resin content. There was a series of test sheets prepared using each of 5, 9, 19, and 26 plies of fabric. A total of 19 Example sheets and 25 Comparative sheets were so-prepared and tested.

Figure 1B:
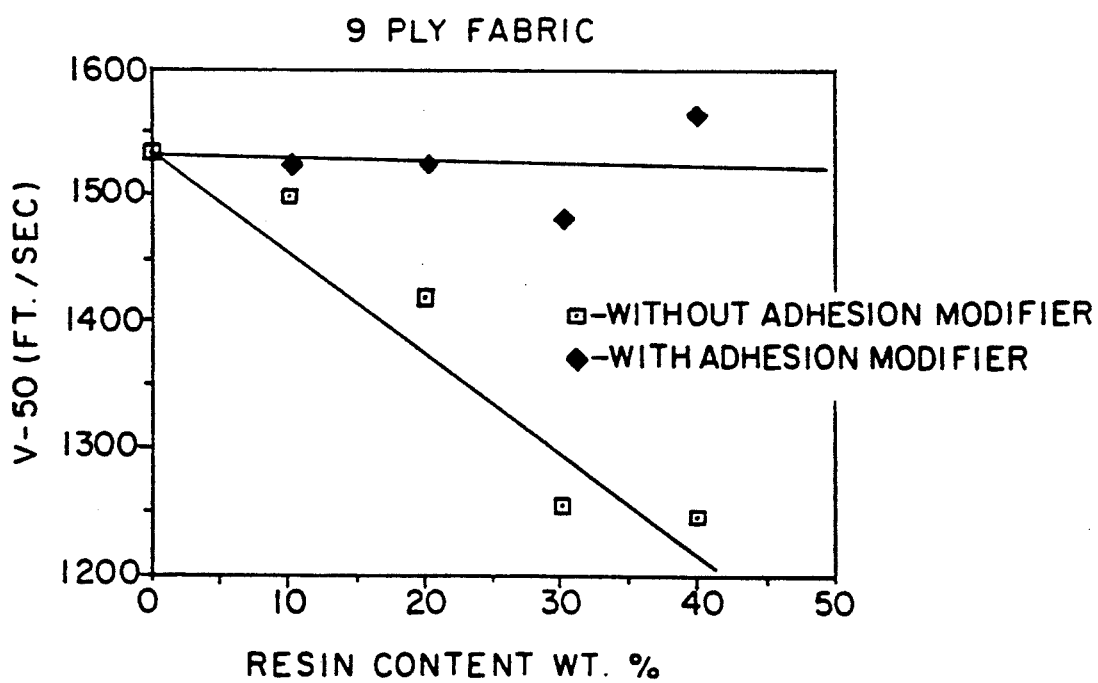
Figure 1C:
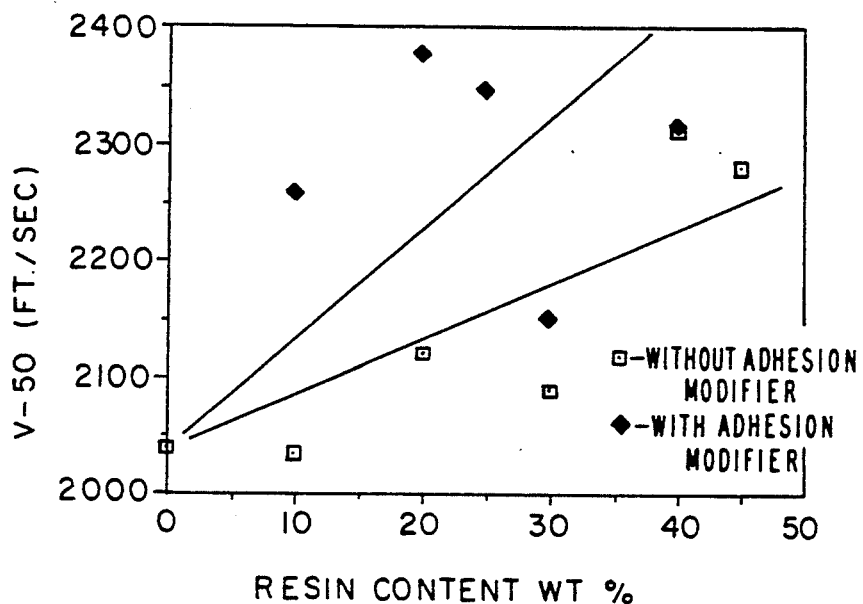
Figure 1D:
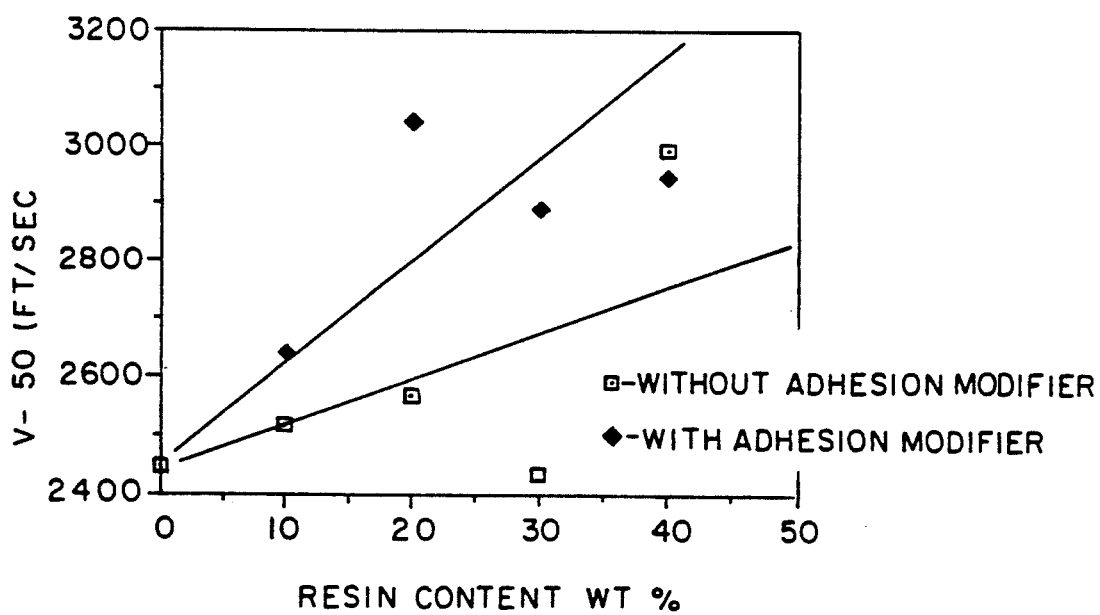

Ballistics testing was performed and ballistics limits ($V_{50}$) were determined for the sheets in each series as in Example 1. Ballistics results are tabulated in Table II and displayed graphically in FIG. 1 for each of the series. Although there is the expected scatter in the test results, it is apparent that the ballistics limits of the rigid composites containing p-aramid fabric with an adhesion modifier are higher than the ballistics limits of the composites without an adhesion modifier over the entire range of resin content studied (10–45 percent, by weight of fabric).

TABLE II

| # of Plies | With Adhesion Modifier | | | Without Adhesion Mod. | | |
| --- | --- | --- | --- | --- | --- | --- |
| | Resin % | Compos. Areal Density (lb/ft2) | Ballist. limit $V_{50}$ (ft/sec) | Resin % | Compos. Areal Density (lb/ft2) | Ballist. limit $V_{50}$ (ft/sec) |
| 5 | 14.2 | 0.56 | 1249 | 12.5 | 0.56 | 1209 |
| | 16.3 | 0.58 | 1251 | 17.9 | 0.57 | 1199 |
| | — | — | — | 18.7 | 0.57 | 1139 |
| | — | — | — | 19.5 | 0.58 | 1183 |
| | — | — | — | 18.5 | 0.57 | 1131 |
| | 24.1 | 0.62 | 1265 | 26.6 | 0.63 | 1091 |
| | 31.1 | 0.67 | 1110 | 29.7 | 0.66 | 1066 |
| | — | — | — | 31.1 | 0.67 | 1139 |
| | 41.9 | 0.80 | 1141 | 40.7 | 0.80 | 968 |
| 9 | 10.3 | 0.93 | 1526 | 11.4 | 0.97 | 1501 |
| | 19.1 | 1.02 | 1525 | 19.3 | 1.04 | 1417 |
| | — | — | — | 19.6 | 1.05 | 1404 |
| | — | — | — | 19.7 | 1.04 | 1401 |
| | — | — | — | 18.9 | 1.03 | 1455 |
| | 28.0 | 1.15 | 1482 | 32.6 | 1.26 | 1255 |
| | 39.3 | 1.41 | 1564 | 39.7 | 1.37 | 1247 |
| 19 | 8.0 | 1.92 | 2260 | 13.8 | 2.08 | 2035 |
| | 20.1 | 2.19 | 2377 | 20.3 | 2.23 | 2108 |
| | — | — | — | 19.8 | 2.37 | 2099 |
| | 23.9 | 2.31 | 2345 | 20.0 | 2.30 | 2153 |
| | 26.0 | 2.37 | 2149 | 29.8 | 2.61 | 2088 |
| | 35.2 | 2.72 | 2313 | 40.2 | 3.13 | 2368 |
| | — | — | — | 40.2 | 2.98 | 2253 |
| | — | — | — | 44.2 | 3.13 | 2278 |
| 26 | 10.4 | 2.80 | 2643 | 12.5 | 2.84 | 2522 |
| | 23.7 | 3.12 | 3045 | 21.3 | 3.12 | 2572 |
| | 24.0 | 3.17 | 2897 | 28.1 | 3.41 | 2433 |
| | 34.6 | 3.70 | 2944 | 39.0 | 4.14 | 2992 |
| | — | — | — | 40.4 | 4.05 | 2999 |

EXAMPLE 3

This example describes the preparation of additional rigid composite articles of this invention using a matrix of modified phenolic resin.

The fabric used for the first portion of this example was made from poly (p-phenylene terephthalamide) fiber sold by E. I. du Pont de Nemours & Company under the trademark designation Kevlar ® 129. It is a very high strength fiber with a tenacity of 26.5 grams per denier. The fabric, identified as Style 703, is a plain weave construction with a nominal 31 picks and 31 ends per inch of 840 denier yarn and a dry basis weight of 6.57 oz./yd² (223 g./sq.meter).

The fabric was scoured using the same procedure as was used in Example 1. A portion of this fabric was coated using the same procedure and the same kind of solid adhesion modifier as was used in Example 1, hereinafter called Coating A.

A second portion of the scoured fabric was dipped once in a bath containing a dispersion of another adhesion modifier of this invention (described below) at 30° C. and passed through rubber nip rollers. The fabric was then dried on the screen of a tenter frame for 2 minutes at 360° F. (182° C.) and cured in a second pass for 2 minutes at 360° F. (182° C.). This is called coating B.

The adhesion modifier bath for Coating B contained: (1) a fluorochemical mixture, as an aqueous dispersion, comprising several materials. The first, about 1.9% of the bath, is a perfluoroalkyl acrylic polymer derived from the 2-perfluoroalkylethyl ester of acrylic acid wherein the 2-perfluoroalkylethyl group had the formula $C_nF_{2n+1}(CH_2)_2-$, and n had a value from 5–11; the second comprising about 0.25% of the bath is an alkoxylated carboxylic acid; the third, acetone, comprising about 1% of the bath; the fourth, ethylene glycol, comprising 0.5% of the bath; the fifth, a surfactant, comprising 0.1% of the bath, is like that described in Example 1. (2) a wax-melamine mixture, comprising about 2% of the bath weight, like that described in Example 1. The surface modified fabrics contained about 1.6% of the Coating A and 1.5% of Coating B.

The two coated fabrics, along with the scoured control without any adhesion modifier were then impregnated with nominally 18% by weight of a blend of 50% phenolic resin and 50% polyvinyl butyral resin, which are described more completely in Military Specification MIL-H-44099A. The resins were uniformly applied by dipping or roll application. This was done in a commercial operation where the toughened phenolic resin was partially cured and volatiles reduced to 1-3% before composite fabrication.

To make the rigid composites, the impregnated fabrics were cut into rectangular pieces 12×15 inches (30.5×38 cm); 28 layers of each were stacked between polyester release films and ¼" (6.4 mm) thick aluminum plates and cured in a press at 200 psi (1379 kPa) and 340° F.(171° C.) for 60 minutes. The pressure was maintained until the press cooled to 80° F. (27° C.), after which the samples were removed from the press, the top and bottom aluminum plates and release films removed and the composite trimmed to 11×14 inches (27.9 cm×35.6 cm) for ballistic testing.

Ballistic tests of the rigid composite samples were conducted in accordance with MIL-STD-662D using 17 grain fragment simulating projectiles as described in Example 1. The actual resin content of each rigid composite sample was calculated from the known weight of the fiber in the sample and the total weight of the sample. The composite areal density was calculated by dividing sample weight by its surface area.

The results are shown in Table III.

A second set of composite samples was prepared using Style 735 fabric of Kevlar® 29 aramid as described in Example 2. One piece of fabric was scoured and another was scoured and coated with 1.8% of the fluorochemical mixture described as Coating B. Both were prepregged with the phenolic/polyvinyl butyral resin blend described earlier and composite ballistics samples made and tested against the 17 grain fragment simulating projectile. Results for these samples are also shown in Table III.

The ballistic limit ($V_{50}$) was significantly improved of each rigid composite sample in which the p-aramid reinforcement was coated with an adhesion modifier. Since energy absorption of the targets is proportional to the square of the ballistic limit, the improvements in energy absorbing capacity are even more dramatic.

EXAMPLE 4

This example describes the preparation of additional rigid composite articles of this invention using matrices of polyester and a modified phenolic resin. This example also describes the use of epoxies as matrix resins and the ballistic ineffectiveness of composites made with epoxies.

The fabric used for this example was made from the same fiber as was used in Example 3, above. The fabric was a plain weave having approximately 31×31 ends and picks per inch (12.2×12.2 per centimeter).

The fabric, but for two control sections, was coated using the same procedure and the same kind of solid adhesion modifier as was used in Example 1. Separate samples of the fabrics were then impregnated by various matrix resins to be made into rigid composites.

One of the matrix resins of this invention was the modified phenolic resin described in Example 3, above. Another matrix resin of this invention was the polyester described in Example 1, above. As comparison matrix resins, there were epoxy resins sold by Shell Chemical Company under the trade designations "Epon 828" and "Epon 8132". The curing agent for the "Epon 828" was the material sold by Pacific Anchor Chemical Corp. under the trade designation "Amicure-PACM"; and the curing agent for the "Epon 8132" was the material sold by Henkel Corp. under the trade designation "Versamid 140".

Rigid composites were made using 32 layers of fabric cut as described in Example 3 and by using the curing cycles described below. Ballistic tests of the rigid composite samples were conducted in accordance with MIL-STD-662D using 17 grain fragment simulating projectiles as described in Example 1.

The modified phenolic resin was applied and cured by the procedure described in Example 3.

The polyester resin composition was a mixture of 400 grams of the polyester resin, 4 grams of "Esperox" 570P curing agent, and 80 grams of acetone as a diluent. The individual fabric layers were impregnated by the composition and the layers were stacked between polyester release films and ¼-inch (6.4 mm) thick aluminum plates and cured in a press at 100 psi (690 kPa) and 225° F. (107° C.) for 60 minutes. The samples were then cooled under pressure until the temperature dropped to 140° F. (60° C.).

One epoxy resin composition was a mixture of 380 grams of "Epon 828" epoxy resin and 106 grams of "Amicure-PACM" curing agent. The individual fabric layers were impregnated by the composition and the layers were stacked between polyester release films and ¼-inch (6.4 mm) thick aluminum plates and cured in a press at 200 psi (1379 kPa) and 300° F. (149° C.) for 90

TABLE III

| Fabric Style | Adhesion Modifier | No. of Plies | Actual Resin % | Composite Areal Density, lb/ft2 | Ballistic Limit $V_{50}$ ft/sec | % Improvement Vs. Control | |
|---|---|---|---|---|---|---|---|
| | | | | | | Ballistic Limit $V_{50}$ | Energy Absorb. |
| 703 | None | 28 | 21.2 | 1.61 | 1928 | | |
| 703 | A | 28 | 19.3 | 1.61 | 2034 | 5.5 | 11.3 |
| 703 | A | 28 | 17.7 | 1.58 | 2068 | 7.3 | 15.1 |
| 703 | B | 28 | 18.9 | 1.60 | 1971 | 2.2 | 4.4 |
| 703 | B | 28 | 16.1 | 1.55 | 2025 | 5.0 | 10.2 |
| 735 | None | 15 | 26.2 | 1.78 | 1791 | | |
| 735 | B | 15 | 16.6 | 1.69 | 1943 | 8.5 | 17.7 | minutes. The samples were then cooled under pressure until the temperature dropped to 140° F. (60° C.).

The other epoxy resin composition was a mixture of 375 grams of "Epon 8132" epoxy resin and 150 grams of "Versamid 140" curing agent. The same curing procedure and conditions were used for this epoxy as were used for the other epoxy resin except that the curing temperature was 212° F. (100° C.).

Results of the ballistics tests are given in Table IV.

TABLE IV

| Resin | Composite Areal Density (lb/ft$^2$) | % Resin | | V$_{50}$ (ft/sec) |
| --- | --- | --- | --- | --- |
| Polyester | 1.85 | 20.4 | | 2137 |
|  | 1.90 | 22.0 | | 2201 |
|  | 1.93 | 24.3 | | 2181 |
|  |  |  | Average | 2173 |
| (Scoured) | 1.86 | 20.0 | | 1997 |
|  | 1.90 | 21.4 | | 2002 |
|  |  |  | Average | 2000 |
| Phenolic/PVB | 1.76 | 16.8 | | 2144 |
|  | 1.77 | 17.4 | | 2176 |
|  | 1.73 | 15.1 | | 2141 |
|  | 1.76 | 16.1 | | 2191 |
|  |  |  | Average | 2163 |
| Epoxy$^1$ | 1.81 | 18.6 | | 1931 |
|  | 1.83 | 18.4 | | 1960 |
|  | 1.84 | 20.5 | | 2009 |
|  | 1.87 | 19.5 | | 1923 |
|  |  |  | Average | 1956 |
| (Scoured) | 1.87 | 20.4 | | 1781 |
|  | 1.94 | 23.1 | | 1798 |
|  |  |  | Average | 1790 |
| Epoxy$^2$ | 1.77 | 17.0 | | 1869 |
|  | 1.80 | 18.0 | | 1899 |
|  |  |  | Average | 1884 |
| (Scoured) | 1.87 | 21.0 | | 1666 |
|  | 1.88 | 21.0 | | 1659 |
|  |  |  | Average | 1662 |

Epoxy$^1$ is Epon 828
Epoxy$^2$ is Epon 8132

The ballistic limit (V$_{50}$) for rigid composites utilizing the polyester and the modified phenolic resins were high and significantly improved by use of the solid adhesion modifier. The ballistic limits for the rigid composites utilizing the epoxy resins were low. Rigid composites made using epoxy matrix resins and fibers coated with the solid adhesion modifier exhibited ballistic limits which were not even as high as rigid composites utilizing the polyester or the modified phenolic resin and uncoated fibers. Epoxy resins are not eligible for use as matrix resins in this invention.

We claim:

1. A rigid composite comprising a polyester, phenolic, or polyamide resin matrix reinforced with woven fabric of continuous p-aramid filaments coated with from about 0.2 to 5 percent, by weight, of a solid adhesion modifier which reduces the adhesion between said resin matrix and said p-aramid filaments embedded therein, said adhesion modifier selected from the group consisting of a 2- perfluoroalkylethyl ester, a paraffin wax and a combination thereof, said coated filaments when embedded in the matrix and tested in accordance with MIL-STD-662D exhibiting a ballistics limit from about 1000 to 4000 feet per second and a composite areal density from about 0.4 to 6 pounds per square foot.

2. A composite according to claim 1 wherein the filaments comprise from 50 to 90 percent, by weight, of the composite.

3. A composite according to claim 1 wherein the adhesion modifier comprises a 2-perfluoroalkylethyl ester.

4. A composite according to claim 1 wherein the adhesion modifier comprises a paraffin wax.

5. A composite according to claim 1 wherein the adhesion modifier comprises a combination of 2-perfluoroalkylethyl ester and a paraffin wax.

* * * * *